United States Patent Office 2,926,185
Patented Feb. 23, 1960

2,926,185

CHEMICAL PROCESS FOR PREPARING PHENYL DIMETHYL PHOSPHATES

Francis X. Markley, Bound Brook, N.J., and Harold D. Orloff, Oak Park, Mich., assignors to Ethyl Corporation, New York, N.Y., a corporation of Delaware No Drawing. Application April 23, 1958
Serial No. 730,274

2 Claims. (Cl. 260—461)

This invention relates to, and has as its principal object, the preparation of phenyl dimethyl phosphates.

Phenyl dimethyl phosphates where the phenyl group contains up to 8 carbon atoms and up to 1 chlorine atom are exceedingly useful as ignition control compounds when blended in small concentration with leaded gasoline. Prior to this invention there were no published methods of making these compounds.

A theoretically possible reaction for preparing phenyl dimethyl phosphates can be depicted as follows:

$$PhOPOCl_2 + 2CH_3ONa \rightarrow (CH_3O)_2(PhO)PO + 2NaCl \quad (I)$$

However, reactions of this general type are known to proceed only with great difficulty. It has heretofore been pointed out that although mixed alkyl aryl esters of phosphoric acid may be obtained by reacting the appropriate halophosphate ester with a sodium alkoxide or aryloxide, the reaction conditions must be quite drastic because of the much lower reactivity of the halophosphates as compared with phosphoryl chloride. It has been noted that this is especially true when using aryl derivatives of phosphoryl chloride in this general reaction.

In addition to the problem just mentioned, reaction (I) above is further complicated in actual practice by a series of deleterious side reactions which have been found to occur. These side reactions are as follows:

$$(CH_3O)_2(PhO)PO + CH_3ONa \rightarrow (CH_3O)_3PO + PhONa \quad (II)$$

$$(CH_3O)_2(PhO)PO + PhONa \rightarrow (CH_3O)(PhO)POONa + PhOCH_3 \quad (III)$$

Unfortunately, reaction II is exceedingly rapid. Consequently, not only is the desired product—the phenyl dialkyl phosphate—attacked very rapidly by sodium methoxide with the formation of trimethyl phosphate according to reaction (II), but the sodium phenoxide resulting from this reaction also attacks the desired product as shown by (III). It is seen, therefore, that low yields and highly impure mixtures of products are readily encountered because of these, and perhaps other theoretically possible competing side reactions. For example, in practice it has been found that when tolyl phosphorodichloridate was introduced into a solution of sodium methoxide in methanol the yield of tolyl dimethyl phosphate was less than 50 percent. Furthermore, it was found very difficult to isolate even this amount of desired product from the reaction mixture with all of its impurities.

A process has now been discovered whereby under very mild conditions reaction (I) proceeds very readily. Formed are the desired phenyl dimethyl phosphates in very high yields in extremely short reaction periods because by virtue of this process all of the foregoing competitive side reactions have been greatly minimized.

This invention, then, is a process of preparing phenyl dimethyl phosphates characterized by concurrently introducing separate portions of (1) a phenyl phosphorodichloridate and (2) a solution of sodium methoxide in methanol into a reaction zone maintained at a temperature of about 20 to about 70° C., the rate at which said portions are so introduced being such that the pH of the resultant reaction mixture is between 1 and 8, and removing the sodium chloride and the excess methanol from the reaction mixture adjusted to a pH of from 4 to 6.

Besides leading to the preparation of phenyl dimethyl phosphates of high purity in high yields in short reaction times, an important feature of this invention is the fact that the process is readily adapted to continuous operation. This is accomplished by adjusting the rates at which the reactants are fed to the reactor in such a way that the pH is continuously in the range of 4 to 6. In this manner, the by-product sodium chloride and excess methanol can be continuously withdrawn from the reaction zone leaving a stream rich in the phenyl dimethyl phosphate. Even when carrying the process out on a batch basis, the feed rates of the reactants can readily be pre-determined so that the requisite pH of the reaction medium can be maintained without difficulty.

Other ways of insuring the proper pH of the reaction mixture include the use of acid-base indicators or standard potentiometric devices.

Still another feature of the process of this invention is its exceedingly fast reaction rate even though the reaction temperatures are very mild. Generally speaking, the reaction is completed as fast as the reactants are introduced into the reaction zone.

Although high yields have been obtained with fairly concentrated solutions of sodium methoxide in methanol, for ease of feed control, it is desirable to use a concentration which is fluid rather than gel-like. Preferable concentrations fall in the range of about 10 to about 13 percent by weight of sodium in methanol (i.e., parts of sodium per 100 parts of sodium+methanol). Higher concentrations of sodium methoxide result in viscous solutions of high freezing point. Lower concentrations, while usable, present handling and reactor-space problems.

Preparation of the sodium methoxide-methanol feed stream is best accomplished by reacting metallic sodium with excess methanol using such relative proportions as will provide the desired sodium methylate concentration. Thus, another advantage of keeping the sodium methoxide concentration in the range of about 10 to about 13 percent of sodium is the fact that in preparing more concentrated solutions, it has been found that the formation of the methoxide was hindered even under reflux because of coating of the sodium surface by the product.

The following examples illustrate this invention. All parts and percentages are by weight, except when otherwise noted.

Example I

The reaction equipment comprised a reaction vessel provided with a glass and calomel electrode pair connected to a pH meter. The electrodes were immersed in 30-50 parts of methanol. Simultaneously introduced in dropwise fashion into this reaction vessel were m-tolyl phosphorodichloridate (225 parts, 1.0 mole) and 575 parts by volume of sodium methoxide solution containing 48.2 parts of sodium. The period of simultaneous addition was 40 minutes, the temperature being maintained at 62° C. and the pH of the reaction mixture being 6+2. After filtering sodium chloride, the methanol was removed at reduced pressure (25 millimeters) while heated to 50° C. and the product was then washed with 2 quantities (100 parts each) of 5 percent sodium hydroxide solution and 2 volumes (100 parts each) of water. The resulting m-tolyl dimethyl phosphate, dried over sodium sulfate, was a plate yellow oil which had been produced in 94 percent crude yield. It was found to contain 49.6 percent of carbon, 5.90 percent of hydrogen and 14.6 percent of phosphorus. Theory: 50.0 percent of carbon, 6.0 percent of hydrogen and 14.3 percent of phosphorus. m-Tolyl dimethyl phosphate has a refractive index of $n_D^{20}$ 1.4910.

Example II

To reduce undesirable side reactions caused by small local excesses of sodium methoxide, 4-chloro-3-methylphenyl dimethyl phosphate was prepared by simultaneously feeding 0.5 mole (130 parts) of the corresponding dichloridate and 246 parts of 4.07 N sodium methoxide in methanol while maintaining the pH range at 1–3 and holding the temperature at gentle reflux (55–69° C.) by external cooling. The pH was adjusted to 4 before filtering sodium chloride the methanol was evolved at 40–50° C. at reduced pressure. The product was washed once with 125 parts of 7.5 percent sodium carbonate, twice with 1 percent sodium chloride, and then dried by vacuum distilling at 1 millimeter (50° C.). Anal. calcd. for $C_9H_{12}O_4ClP$: phosphorus, 12.39; chlorine, 14.15. Found: phosphorus, 12.0; chlorine, 14.6. The weight of product, 119.9 parts, corresponds to a 95.7 percent crude yield. Distillation yielded 108 parts of pure 4-chloro-3-methylphenyl dimethyl phosphate, B.P., 131° C. (0.75 millimeter). Anal. found: phosphorus, 12.3; chlorine, 14.0. It has a refractive index of $n_D^{20}$ 1.5074.

Example III

The procedure of Example II is repeated using 120 parts (0.5 mole) of p-ethylphenyl phosphorodichloridate and a reaction temperature of 20° C. Formed is p-ethylphenyl dimethyl phosphate.

It is seen from the above illustrative examples that excellent results are achieved when the process of this invention is applied to phenyl phosphorodichloridates made from simple monohydric phenolic compounds and ring-chlorinated derivatives thereof. It is preferable to use a compound made from a monohydric phenol containing up to about 8 carbon atoms in the molecule and up to 1 chlorine atom attached to the ring. Examples of these phenols are phenol, o-, m-, and p-cresol, and the various xylenols, ethylphenols, chlorophenols, chlorocresols, chloroxylenols, and chloroethylphenols. Mixtures of these as well as mixtures of phenolic compounds which are available as articles of commerce can also be used. Such phosphorodichloridates give exceedingly high yields of the corresponding phenyl dimethyl phosphate when subjected to the process of this invention. Nevertheless, use can be made of higher alkyl-substituted phenols and polychlorinated phenolic compounds. Recourse may also be had to brominated phenols and other substituted phenols, such as o-nitrophenol, when preparing the phosphorodichloridates for use in this invention.

An excellent way of making the above phenyl phosphorodichloridates for use in this invention is to heat the appropriate phenol with phosphoryl chloride in a ratio of from 1 to about 2 moles of the chloride per mole of the phenol at about 85 to about 130° C. in the presence of a small, catalytic amount of aluminum chloride or metallic aluminum which has been rendered highly active by refluxing the same with phosphoryl chloride for at least one-half hour. The following example illustrates this procedure.

Example IV

Charged to an autoclave were 104.9 parts of phosphoryl chloride and 1.0 part of aluminum chloride. To this mixture was added 40.7 parts of a commercially-available cresylic acid (neutral equivalent: 119) over a period of 45 minutes during which the temperature was held at 88 to 95° C. After this, the reaction mixture was cooked for 30 minutes at the same temperatures. Then, the excess phosphoryl chloride and HCl were stripped off at pressures less than 50 millimeters of mercury and at a maximum temperature of 160° C. Formed was a high yield of a mixture of phenyl, cresyl, and xylyl phosphorodichloridates.

Instead of reacting the above phosphorodichloridates with sodium methoxide in methanol, use can be made of the other alkali metal salts of methanol. Thus, in preparing the methoxide feed stream, the corresponding amount of lithium, potassium, rubidium, cesium, or mixtures of these, including mixtures with sodium, can be reacted with excess methanol. However, sodium methoxide is definitely preferable because of its high reactivity, ease of preparation and low cost.

In the process of this invention, two moles of sodium methoxide react with each mole of the phosphorodichloridate. Thus, by keeping the pH of the reaction mixture in the ranges set forth above, these proportions of reactants are automatically provided with a few slight variations to enhance the driving force of the reaction. Once the reaction has been completed, the pH of the mixture is adjusted to between 4 and 6, if it is not already within this range, by introducing the requisite amount of the appropriate reactant. Thus, if the pH before the separation step is between 6 and 8, additional phenyl phosphorodichloridate is introduced into the system. On the other hand, if the pH is between 1 and 4, additional sodium methoxide solution is introduced. While carrying out the process of this invention, it is preferable to agitate the reaction mixture to minimize local excesses of either of the reactants.

Still another feature of this invention is the fact that the excess methanol not only constitutes an excellent vehicle for the introduction of the sodium methoxide, but constitutes an excellent reaction solvent. Thus, an auxiliary solvent is unnecessary. However, if desired, use can be made of a supplemental solvent, such as an inert liquid hydrocarbon of the aliphatic or aromatic series. Examples of these are hexane, isooctane, petroleum ether, benzene, toluene, xylene, and the like.

As noted above, the process of this invention is exceedingly rapid. Thus, when it is carried out on a small-scale, reaction times of 15 to about 30 minutes can be used. When carried out on a very large scale, it is seldom necessary to use a reaction time longer than about 4 hours.

Separation of the sodium chloride from the reaction mixture can be accomplished in various ways. Thus, use can be made of filtration, decantation, centrifugation and like procedures. Removal of the excess methanol is best accomplished by distillation at reduced pressure as shown by Examples I through III.

The pre-eminence of the phenyl dimethyl phosphates as ignition control compounds was demonstrated by carrying out a series of fleet tests. Used were various modern automobiles equipped with 11:1 compression ratio engines. The cars were operated under standard driving conditions on a commercially-available gasoline containing 3 milliliters of tetraethyllead per gallon as standard Motor Mix (0.5 theory of bromine as ethylene dibromide and 1.0 theory of chlorine as ethylene dichloride) with which had been blended 1.04 milliliters per gallon of a mixture of tolyl dimethyl phosphate and xylyl dimethyl phosphate (mixed isomers in each instance). It was found that the spark plug life when using this treated fuel as measured by miles required to reach three spark plug failures per car was ten times as long as the spark plug life afforded by the same tests using the corresponding phosphate-free leaded gasoline.

What is claimed is:

1. A process of preparing phenyl dimethyl phosphates characterized by concurrently introducing separate portions of (1) a phenyl phosphorodichloridate wherein the phenyl group contains up to 8 carbon atoms and up to one chlorine atom attached to the ring and (2) a solution of sodium methoxide in methanol into a reaction zone maintained at a temperature of about 20 to about 70° C., the rate at which said portions are so introduced being such that the pH of the resultant reaction mixture is between 1 and 8, and removing the sodium chloride and excess methanol from the reaction mixture adjusted to a pH of from 4 to 6.

2. The process of claim 1 wherein said solution contains about 10 to about 13 percent by weight of sodium based on the total weight of sodium plus methanol.

References Cited in the file of this patent

UNITED STATES PATENTS 2,599,515    Moyle  ------------------ June 3, 1952